United States Patent
Han et al.

(10) Patent No.: US 7,473,457 B2
(45) Date of Patent: *Jan. 6, 2009

(54) WOOD FLOORING COMPOSED OF WPL, BASE AND SOUNDPROOF LAYER

(75) Inventors: Kie-Sun Han, Cheongju-si (KR); Byeong-Hoe Kim, Ulsan (KR); Il-Hong Min, Cheongju-si (KR); Byeong-Roh Jeong, Cheongju-si (KR)

(73) Assignee: LG Chem, Ltd. (KR)

( * ) Notice: Subject to any disclaimer, the term of this patent is extended or adjusted under 35 U.S.C. 154(b) by 513 days.

This patent is subject to a terminal disclaimer.

(21) Appl. No.: 10/546,853

(22) PCT Filed: Sep. 30, 2003

(86) PCT No.: PCT/KR03/01996

§ 371 (c)(1),
(2), (4) Date: Aug. 24, 2005

(87) PCT Pub. No.: WO2004/098881

PCT Pub. Date: Nov. 18, 2004

(65) Prior Publication Data

US 2006/0172118 A1    Aug. 3, 2006

(30) Foreign Application Priority Data

May 6, 2003    (KR) .................. 20-2003-0013966 U
Jun. 5, 2003   (KR) .................. 20-2003-0017703 U

(51) Int. Cl.
| | |
|---|---|
| B32B 21/06 | (2006.01) |
| B32B 21/14 | (2006.01) |
| B32B 29/00 | (2006.01) |
| E04F 13/10 | (2006.01) |
| E04F 13/077 | (2006.01) |
| E04F 15/16 | (2006.01) |
| E04F 15/18 | (2006.01) |

(52) U.S. Cl. .................. 428/167; 428/172; 428/535; 428/537.1; 428/537.5; 52/390; 52/403.1

(58) Field of Classification Search ................ 428/167, 428/172, 535, 537.1, 537.5; 52/390, 403.1
See application file for complete search history.

(56) References Cited

U.S. PATENT DOCUMENTS 5,736,227 A * 4/1998 Sweet et al. ................. 428/192
2002/0136862 A1* 9/2002 Dong et al. .................. 428/150

FOREIGN PATENT DOCUMENTS

| JP | 5-124139 | 5/1993 |
|---|---|---|
| KR | 95-23453 | 8/1995 |
| KR | 2000-0060158 | 10/2000 |
| KR | 2003-0018670 | 3/2003 |

OTHER PUBLICATIONS

PCT International Search Report; International Application No. PCT/KR2003/001996; International Filing date: Sep. 30, 2003; Date of Mailing: Jan. 29, 2004.

* cited by examiner

Primary Examiner—Donald Loney
(74) Attorney, Agent, or Firm—Cantor Colburn LLP

(57) ABSTRACT

Disclosed herein is a back-grooved laminate wood flooring in which a wood veneer of high pressure resin impregnation laminate (WPL) is laminated on a base selected from a vinyl chloride (PVC) resin layer, on oriented strand board (OSB), a high-density fiberboard (HDF) and a waterproof plywood. More specifically, the back-grooved laminate wood flooring comprises a WPL (20), an adhesive layer (40) and a base (10) (a polyvinyl chloride resin layer, OSB, HDF or waterproof plywood) wherein the WPL (20) includes a base-reinforcing layer (24), a natural veneer layer (23), a resin-impregnated overlay layer (22) and a surface UV coating layer (21) layered in this order from the bottom. The back-grooved laminate wood flooring further exhibits excellent soundproofing performance.

7 Claims, 1 Drawing Sheet

Fig. 1 *Prior Art*
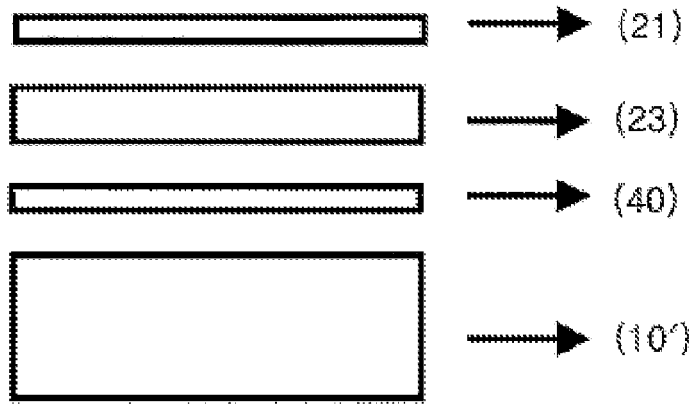
Fig. 2
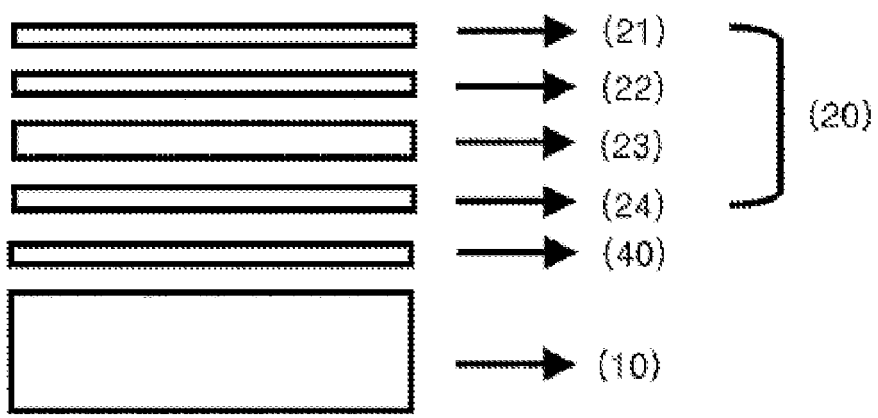
Fig. 3
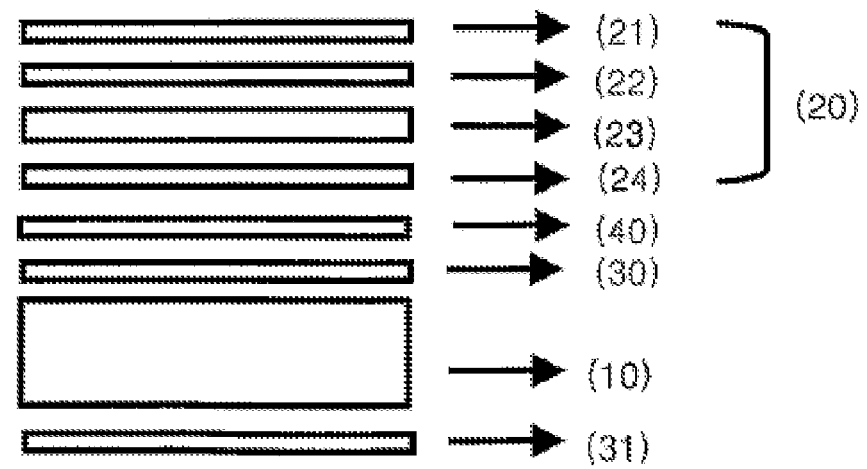

_US 7,473,457 B2_

WOOD FLOORING COMPOSED OF WPL, BASE AND SOUNDPROOF LAYER

TECHNICAL FIELD

The present invention relates to a back-grooved laminate wood flooring for an under-floor heating system in which a wood veneer of high pressure resin impregnation laminate (hereinafter, referred to as a 'WPL') is laminated on a base selected from a polyvinyl chloride resin layer, an oriented strand board (OSB), a high density fiberboard (HDF) and a waterproof plywood. More particularly, the present invention relates to a back-grooved laminate wood flooring for an under-floor heating system comprising a WPL, an adhesive layer and a back-grooved base wherein the WPL includes a base-reinforcing layer (made of shielding paper, high-density fiberboard or kraft paper), a resin impregnated or not impregnated natural veneer layer, a resin-impregnated overlay layer and a surface UV coating layer layered in this order from the bottom, the back-grooved base is selected from a polyvinyl chloride resin layer, an oriented strand board (OSB), a high-density fiberboard (HDF) and a waterproof plywood, and the WPL and the base are adhered to each other by the adhesive layer.

BACKGROUND ART

FIG. 1 is a cross-section showing a conventional wood flooring for an under-floor heating system in which an untreated upper natural veneer layer 23 is laminated on a waterproof plywood layer 10'. As shown in FIG. 1, the conventional wood flooring for an under-floor heating system in which the untreated natural veneer layer 23 is UV-coated or impregnated in a resin. An adhesive layer 40 is interposed between the natural veneer layer 23 and the waterproof plywood layer 10'.

Wood flooring structures in which two melamine-impregnated overlay sheets are layered to both surfaces of a natural veneer were suggested. These wood floorings have a surface strength higher than conventional UV-coated wood floorings. However, they have problems that the natural texture is poor and curls are likely to occur, which negatively affects the quality of the finished products.

The respective layers constituting the conventional wood flooring for an under-floor heating system are briefly explained below with reference to FIG. 1.

The waterproof plywood layer 10' is produced by layering 5 to 7 veneers together using a phenol or melamine resin adhesive in such a manner that the grain directions of the veneers are at right angles to each other, and pressing the laminate in a press.

The upper natural veneer layer is produced by impregnating or not impregnating a natural veneer in an impregnating resin, or impregnating the resin into the natural veneer under reduced or high pressure. The surface UV coating layer is produced by subjecting the upper natural veneer to top, intermediate or under coating 6~10 times using a urethane acrylate paint in a process known in the art. Since the conventional wood flooring for an under-floor heating system comprises the waterproof plywood layer 10', it exhibits excellent dimensional stability against heat and moisture.

However, since the untreated upper natural veneer has a problem of a low density, the wood flooring exhibits a surface scratch resistance as low as 0.5~1 N and an impact resistance as low as 10~20 cm. The scratch resistance is measured by scratching using a diamond needle after UV-coating the surface of the natural veneer, and the impact resistance is measured by dropping a metal ball weighing 225 g onto the surface of the natural veneer. There is a large possibility that the conventional wood flooring is easily impaired when laying heavyweight household appliances on the wood flooring and using them. Accordingly, the conventional wood flooring causes consumer complaints and cannot satisfy consumer's diverse needs. There is, thus, a need for wood floorings having improved physical properties.

In fact, the surface strength of the wood flooring for an under-floor heating system is measured in accordance with a common method known in the art. For example, the scratch resistance is measured by scratching the surface of a test piece cut in a predetermined size from the wood flooring for an under-floor heating system at room temperature using a diamond needle and is expressed in a 0.5 N unit. The impact resistance is measured by dropping a weight (225 g) from increasing height (by 10 cm) onto the surface of the test piece, and then the presence of damage to the test piece is visually observed.

DISCLOSURE OF THE INVENTION

Therefore, the present invention has been made in view of the above problems, and it is an object of the present invention to provide a back-grooved laminate wood flooring for an under-floor heating system manufactured by a WPL technique. The back-grooved laminate wood flooring thus manufactured exhibits considerably improved surface strength and natural texture, compared to conventional wood floorings for an under-floor heating system.

It is another object of the present invention to provide a back-grooved laminate wood flooring for an under-floor heating system which exhibits excellent soundproofing performance.

In order to accomplish the above objects of the present invention, there is provided a laminate wood flooring for an under-floor heating system comprising a WPL, an adhesive layer and a back-grooved base wherein the WPL includes a general UV or primer-treated UV coating layer, a resin-impregnated overlay layer, a resin impregnated or not impregnated natural veneer layer and a base-reinforcing layer layered in this order from the top, the back-grooved base is selected from a polyvinyl chloride resin layer, an oriented strand board (OSB), a high-density fiberboard, (HDF) and a waterproof plywood, and the WPL and the base are adhered to each other by the adhesive layer.

As used herein, the general UV coating layer is referred to as a layer formed by a UV coating process known in the art, and the primer-treated UV coating layer is referred to as a layer formed by coating an amino resin (urea, melamine or urea-melamine resin)-impregnated product, which is a new process which has not been reported until now.

For reducing noise transmission between floors and imparting improved soundproofing performance, the laminate wood flooring for an under-floor heating system further comprises at least one soundproof layer laminated in at least one position selected from (a) between the WPL and the base and (b) under the base.

The back-grooved laminate wood flooring for an under-floor heating system according to the present invention is manufactured by a method comprising the steps of: pressurizing a strand or fiber obtained by cutting or fibered lumber in a urea, urea-melamine, phenol, resorcinol or MDI (4,4'-dimethyldiisocyanate) resin to form a strand board or high-density fiberboard; layering 5 to 7 veneers together using a phenol or melamine resin adhesive in such a manner that the grain directions of the veneers are at right angles to each other, and pressing the laminate in a press to produce a waterproof plywood layer; impregnating an overlay paper in a resin selected from urea, urea-melamine, melamine, phenol, acryl, polyester, unsaturated polyester, epoxy, polyvinyl acetate, polyvinyl alcohol and urethane resins to produce a surface-protective paper layer (resin-impregnated overlay layer), the overlay paper being prepared by uniformly distributing wear-resistant silica or alumina particles in a cellulose paper; cutting natural raw lumber using a rotary lathe or slicer to produce a natural veneer layer; impregnating a kraft paper in a resin selected from urea, phenol, acryl, polyester, unsaturated polyester, epoxy, polyvinyl acetate, polyvinyl alcohol and urethane resins to produce a base-reinforcing layer; pressurizing a fiber obtained by fibered lumber in a resin selected from urea, melamine, urea-melamine and phenol resins to form a high-density fiberboard; laying the high-density fiberboard or kraft paper, the impregnated or not impregnated natural veneer and the overlay paper in this order from the bottom, and pressing the layering under high pressure at high temperature to produce an upper WPL; applying a resin selected from melamine, polyurethane and epoxy adhesives onto a base selected from a polyvinyl chloride resin layer, an OSB, an HDF and a waterproof plywood, to form an adhesive layer, adhering the WPL to the adhesive layer, and pressing the laminate under high pressure at high temperature; and coating the resulting structure using UV light or a urethane primer, and grooving the back surface of the base.

Preferably, for the purpose of reducing noise transmission between floors and imparting improved soundproofing performance, the method for manufacturing the laminate wood flooring for an under-floor heating system according to the present invention further comprises the step of laminating at least one soundproof layer in at least one position selected from (a) between the WPL and the base (one selected from a polyvinyl chloride resin layer, an OSB, an HDF and a waterproof plywood) and (b) under the base (one selected from a polyvinyl chloride resin layer, an OSB, an HDF and a waterproof plywood).

BRIEF DESCRIPTION THE DRAWINGS

The above and other objects, features and other advantages of the present invention will be more clearly understood from the following detailed description taken in conjunction with the accompanying drawings, in which:

FIG. 1 is a cross-section showing a conventional wood flooring for an under-floor heating system in which an upper natural veneer is laminated on a base;

FIG. 2 is a cross-section of a laminate wood flooring for an under-floor heating system in which a WPL is laminated on a back-grooved base, in accordance with an embodiment of the present invention; and FIG. 3 is a cross-sectional view of another laminate wood flooring for an under-floor heating system of the present invention in which two soundproof layers are added to the wood flooring of FIG. 2, in accordance with another embodiment of the present invention.

BEST MODE FOR CARRYING OUT THE INVENTION

The present invention will now be described in more detail with reference to the following examples and accompanying drawings. However, these examples and drawings are not to be construed as limiting the scope of the invention.

A base-grooved laminate wood flooring for an under-floor heating system according to one embodiment of the present invention is shown in FIG. 2. As shown in FIG. 2, the surface of an upper WPL 20 is coated using UV light or coated with a primer-treatment followed by UV light irradiation. The upper WPL 20 and a base 10 are adhered to each other by an adhesive layer 40.

The upper WPL 20 includes a base-reinforcing layer 24 made of at least one material selected from shielding paper, high density fiberboard and kraft paper, a resin-impregnated or not impregnated natural veneer layer 23, a resin-impregnated overlay layer 22 and a general UV coating layer or urethane type primer-treated special UV coating layer 21 layered in this order from the bottom.

In the back-grooved laminate wood flooring for an under-floor heating system in which the upper WPL 20 is laminated on the base 10 selected from a polyvinyl chloride resin layer, an oriented strand board (OSB), a high-density fiberboard (HDF) and a waterproof plywood, the respective layers and the lamination procedure are explained in detail below.

The polyvinyl chloride resin layer is produced to a thickness of 1.0~5.0 mm from a composition consisting of a PVC resin, a plasticizer, a filler and a stabilizer.

The OSB and HDF are produced by pressurizing a strand or fiber obtained by cutting or fibered lumber in a phenol, resorcinol or MDI resin, followed by forming it. The waterproof plywood layer is produced by layering 5 to 7 veneers together using a phenol or melamine resin adhesive in such a manner that the grain directions of the veneers are at right angles to each other, and pressing the laminate in a press. These layers exhibit little dimensional stability due to heat and moisture and thus are suitable for use in an under-floor heating system.

Next, each layer constituting the upper WPL 20 will be described.

UV treatment of the overlay layer 22 is carried out 6~10 times in terms of surface protection and high quality appearance. The UV coating layer 21 is produced by impregnating the overlay layer 22 in an amino resin (urea, melamine or urea-melamine resin), followed by primer treatment and UV light irradiation.

The overlay layer 22 is produced to impart surface physical properties, e.g., wear resistance and scratch resistance, to the laminate wood flooring for an under-floor heating system according to the present invention.

The overlay layer 22 is produced by impregnating an overlay paper in a resin selected from urea, urea-melamine, melamine, phenol, acryl, polyester, unsaturated polyester, epoxy, polyvinyl acetate, polyvinyl alcohol and urethane resins in an amount of 150~300% by weight, based on the weight of the overlay paper, followed by drying and semi-curing in an oven at 90~150° C. for 0.5~4 minutes. At this time, the overlay paper is prepared by uniformly distributing wear-resistant silica or alumina particles in a cellulose paper having a basis weight of 20~100 g/m$^2$.

By means of the wear-resistant particles and impregnating resin, the overlay layer 22 exhibits a high wear resistance of 200~20,000 times when abraded with sandpaper.

The natural veneer layer 23 underlying the overlay layer 22 is produced by cutting natural raw lumber for improved natural texture of the laminate wood flooring for an under-floor heating system according to the present invention. Specifically, the natural veneer layer 23 is produced by cutting natural raw lumber using a rotary lathe or slicer to a thickness of 0.3~5 mm. For improved water resistance and hardness, the natural veneer layer 23 may be produced by dipping a natural veneer in a resin or impregnating the resin into the natural veneer under reduced pressure, and drying and semi-curing in an oven at 80~150° C. for 0.5~4 minutes. The resin used to produce the natural veneer layer 23 is a resin selected from urea, urea-melamine, melamine, phenol, acryl, polyester, unsaturated polyester, epoxy, polyvinyl acetate and urethane resins in an amount of 30~150% by weight, based on the weight of the natural veneer.

Next, the base-reinforcing layer 24 made of shielding paper, HDF or kraft paper is produced in such a manner that the surface UV coating layer 21 and the overlay layer 22 are supported and the WPL is made in a sheet form having a certain thickness.

The base-reinforcing layer made of HDF is produced by treating a fiber obtained from a coniferous or deciduous tree in a resin selected from urea, urea-melamine, phenol and resorcinol resins in an amount of 4~20% by weight, based on the weight of the fiber, followed by forming, pressing at high temperature and curing.

The base-reinforcing layer made of kraft paper is produced by impregnating a kraft paper having a basis weight of 80~300 g/m$^2$ in a resin selected from urea, phenol (preferably transparent phenol), acryl, polyester, unsaturated polyester, epoxy, polyvinyl acetate, polyvinyl alcohol and urethane resins in an amount of 40~150% by weight, based on the weight of the craft paper, followed by drying and semi-curing in an oven at 80~150° C. for 0.5~3 minutes. Two or more sheets of the kraft paper can be used depending on the desired thickness.

The upper WPL 20 is produced by laying the base-reinforcing layer 24 made of shielding paper, high-density fiberboard or kraft paper, the resin-impregnated or not impregnated natural veneer layer 23 and the resin-impregnated overlay layer 22 in this order from the bottom, pressing the laminate in a press under 20~100 kg/cm$^2$ at 120~180° C. for 15~60 minutes, and cooling the laminate under the same pressure for 15~30 minutes.

The upper WVPL 20 and the base 10 are adhered to each other by the adhesive layer 40.

Examples of adhesives used to produce the adhesive layer 40 include thermosetting melamine, and thermosetting or room temperature-curable urethane and epoxy resins.

When the thermosetting melamine resin is used as the adhesive, it is applied onto the base 10 in an amount of 80~300 g/m$^2$ to form the adhesive layer 40. When the thermosetting or room temperature-curable urethane or epoxy resin is used as the adhesive, it is applied onto the base 10 in an amount of 80~250 g/m$^2$ to form the adhesive layer 40. Thereafter, the upper WPL 20 is laid on the adhesive layer 40. When the thermosetting melamine resin is used as the adhesive, the laminate is pressed under 10~15 kgf/cm$^2$ for 1~5 minutes and then cured. When the room temperature-curable urethane or epoxy resin is used as the adhesive, the laminate is pressed under 10~15 kgf/cm$^2$ for 2~4 hours and then cured.

The press of the base 10 and the upper WPL 20 at room temperature can minimize deformation due to heat.

FIG. 3 is a cross-sectional view of another laminate wood flooring for an under-floor heating system of the present invention in which two soundproof layer are added to the wood flooring of FIG. 2, in accordance with another embodiment of the present invention. As shown in FIG. 3, a first soundproof layer 30 is interposed between the upper WPL 20 and the adhesive layer 40, and a second soundproof layer 31 underlies the base 10. However, the position and number of the soundproof layers are not specially limited.

As materials of the soundproof layers, polyvinyl chloride (PVC), polyethylene (PE), ethylene vinyl acetate (EVA), polypropylene (PP), polyurethane (PU), polyester non-woven fabrics, chloroprene rubber (CR), acrylonitrile butadiene rubber (NBR), etc., can be used. In addition, the surface of the soundproof layers can be processed by a chemical cross-linking and foaming process or a high-pressure foaming process including an embossing and intaglio technique.

EXAMPLES

1. Production of Polyvinyl Chloride Resin Layer, Strand Board, High-Density Fiberboard and Waterproof Plywood Layer 10

A polyvinyl chloride resin layer was produced to a thickness of 1.0~5.0 mm from a composition consisting of a PVC resin, a plasticizer, a filler and a stabilizer.

A strand board and a high-density fiberboard were produced by pressurizing a strand or fiber obtained by cutting or fibered lumber in a melamine resin, followed by forming it. A waterproof plywood layer 10 was produced by layering 5 to 7 veneers together using a melamine resin in such a manner that the grain directions of the veneers were at right angles to each other, and pressing the laminate in a press.

2. Production of Upper WPL 20

1) Production of UV Coating Layer 21

UV coating was carried out 6~10 times in terms of surface protection and high quality appearance. As for an overlay layer impregnated in an amino resin (urea, melamine or urea-melamine resin), UV coating was carried out following primer treatment.

2) Production of Overlay Layer 22

An overlay layer 22 was produced by impregnating an overlay paper in urea-melamine, melamine and acryl resins, respectively, and flowed by drying and semi-curing in an oven at 90~150° C. for 0.5~4 minutes. At this time, the overlay paper was prepared by uniformly distributing wear-resistant silica or alumina particles in a cellulose paper having a basis weight of 20~100 g/m$^2$.

3) Production of Natural Veneer Layer 23

A natural veneer layer 23 was produced by cutting natural raw lumber using a rotary lathe or slicer to a thickness of 0.3~5 mm. For improved water resistance and hardness, the natural veneer layer 23 was produced by dipping a natural veneer in polyester resin and melamine resin, respectively, or impregnating the resins into the natural veneer under reduced pressure, followed by drying and semi-curing in an oven at 80~150° C. for 0.5~4 minutes.

4) Production of Base-Reinforcing Layer 24 Made of Shielding Paper, HDF, Kraft Paper A base-reinforcing layer 24 made of shielding paper, HDF or kraft paper was produced in such a manner that the overlay layer 22 and the natural veneer layer 23 were supported and the WPL was made in a sheet form having a certain thickness.

The base-reinforcing layer 24 made of shielding paper was produced by impregnating a cellulose wood-free paper having a basis weight of 50~150 g/m$^2$ in a phenol resin, followed by drying and semi-curing in an oven at 80~150° C. for 0.5~3 minutes. Two or more sheets of the shielding paper can be used depending on the desired thickness.

The base-reinforcing layer 24 made of HDF was produced by treating a fiber obtained from a coniferous or deciduous tree in a phenol resin, followed by forming, pressing at high temperature and curing.

The base-reinforcing layer 24 made of kraft paper was produced by impregnating a kraft paper having a basis weight of 80~300 g/m$^2$ in a phenol resin, followed by drying and semi-curing in an oven at 80~150° C. for 0.5~3 minutes. Two or more sheets of the kraft paper can be used depending on the desired thickness.

As the phenol resin used to produce the base-reinforcing layer, a transparent phenol resin was preferably used.

5) Production of Upper WPL 20

A upper WPL 20 was produced by laying the layers produced in 1) to 4) above, 1 to 3 sheets of the base-reinforcing layer, the natural veneer layer 23 and the overlay layer 22 and the surface UV coating layer 21 in this order from the bottom, pressing the laminate in a press under 20, 40, 60, 80 and 100 kgf/cm$^2$ at 130~140° C. for 15~60 minutes, respectively, and cooling the laminate under the same pressure for 20 minutes.

3. Formation of Adhesive Layer 40 on Base 10, and Lamination of Upper WPL 20 Thereon An adhesive layer 40 was produced by applying a thermosetting melamine resin onto the base 10 in an amount of 150 g/m$^2$. Alternatively, an adhesive layer 40 was produced by applying a room temperature-curable urethane or epoxy resin onto the base 10 in an amount of 200 g/m$^2$. Thereafter, the upper WPL 20 was laid on the adhesive layer 40. When the thermosetting melamine resin was used as the adhesive, the laminate was pressed under 12 kgf/cm$^2$ for 5 minutes and then cured. When the room temperature-curable urethane or epoxy resin was used as the adhesive, the laminate was pressed under 10 kgf/cm$^2$ for 2 hours and then dried at 80° C. for 2 hours to manufacture a laminate wood flooring for an under-floor heating system.

The surface physical properties of the laminate wood flooring for an under-floor heating system (Example) thus manufactured were compared with those of a conventional natural veneer-decorated wood flooring for an under-floor heating system (Comparative Example). The results are shown in Table 1.

The surface strength of the wood floorings was measured in accordance with the following common procedure. The scratch resistance was measured by scratching the surface of a test piece having a predetermined size using a diamond needle and was expressed in a 0.5N unit. The impact resistance was measured by dropping a weight (225 g) from increasing height (by 10 cm) onto the surface of the test piece and then the presence of damage to the test piece was visually observed.

TABLE 1

|  | Example | Comparative Example |
|---|---|---|
| Scratch resistance (N) | 2~5 | 0.5~1 |
| Impact resistance (cm) | 30~80 | 10~20 |

As is apparent from the data shown in Table 1, the surface physical properties of the laminate wood flooring for an under-floor heating system according to the present invention were greatly improved, compared to those of the conventional wood flooring for an under-floor heating system. The scratch resistance increased to a maximum of 5 N, and the impact resistance increased to a maximum of 80 cm. These results indicate that the WPL technique of natural veneer greatly can improve the surface strength and thus eliminates consumer complaints and satisfies consumer's diverse needs.

INDUSTRIAL APPLICABILITY

As apparent from the foregoing, the back-grooved laminate wood flooring for an under-floor heating system in which a WPL is laminated on a base according to the present invention are greatly improved in scratch resistance (2~5N) and impact resistance (30~80 cm), compared to the conventional wood flooring for an under-floor heating system. In addition, the back-grooved laminate wood flooring for an under-floor heating system exhibits considerably improved natural texture by UV coating a urethane primer onto the overlay layer impregnated in an amino resin, and minimizes the occurrence of curls by using a (transparent) phenol resin for the base-reinforcing layer, instead of a melamine resin. Furthermore, since the back-grooved laminate wood flooring for an under-floor heating system further comprises at least one soundproofing layer, soundproofing performance is improved after installation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A laminate wood flooring for an under-floor heating system comprising a wood veneer of high pressure resin impregnation laminate (WPL), an adhesive layer and a base,
  wherein the WPL includes a base-reinforcing layer impregnated in a phenol resin, a resin-impregnated or not impregnated natural veneer layer, a resin-impregnated overlay layer including an overlay paper impregnated in an amino resin selected from urea, urea-melamine or melamine resins, and a urethane primer-treated UV coating layer layered in this order from the bottom, the base-reinforcing layer being made of at least one material selected from a high-density fiberboard, a kraft paper or a shielding paper,
  the base is back-grooved, and is selected from a polyvinyl chloride resin layer, an oriented strand board (OSB), a high-density fiberboard (HDF) or a waterproof plywood, and
  the WPL and the base are adhered to each other by the adhesive layer.

2. The laminate wood flooring for an under-floor heating system according to claim 1, wherein the resin-impregnated natural veneer layer is produced by cutting natural raw lumber to a natural veneer having a thickness of 0.3~5 mm, and dipping the cut natural veneer in a resin or impregnating a resin into the natural veneer under reduced pressure, the resin being selected from urea, urea-melamine, melamine, phenol, acryl, polyester, unsaturated polyester, epoxy, polyvinyl acetate or urethane resins and used in an amount of 30~150% by weight, based on the weight of the natural veneer.

3. The laminate wood flooring for an under-floor heating system according to claim 1, wherein the resin-impregnated overlay layer is produced by impregnating an overlay paper in a resin selected from urea, urea-melamine, or melamine resins in an amount of 150~300% by weight, based on the weight of the overlay paper, the overlay paper being prepared by uniformly distributing wear-resistant silica or alumina particles in a cellulose paper having a basis weight of 20~100 g/m$^2$.

4. The laminate wood flooring for an under-floor heating system according to claim 1, wherein the base-reinforcing layer made of shielding paper is produced by impregnating a cellulose wood-free paper having a basis weight of 50~150 g/m$^2$ in a transparent phenol resin, and the base-reinforcing layer made of kraft paper is produced by impregnating a kraft paper having a basis weight of 80~300 g/m$^2$ in a transparent phenol resin.

5. The laminate wood flooring for an under-floor heating system according to claim 4, wherein two or more sheets of the resin-impregnated shielding paper, high-density fiberboard or kraft paper are alternatively used depending on the desired thickness.

6. The laminate wood flooring for an under-floor heating system according to claim 1, further comprising at least one soundproof layer laminated in at least one position selected from (a) between the WPL or the base and (b) under the base.

7. The laminate wood flooring for an under-floor heating system according to claim 6, wherein the soundproof layer is made of a polymer selected from polyvinylchloride (PVC), polyethylene (PE), ethylene vinyl acetate (EVA), polypropylene (PP), polyurethane (PU), polyester, non-woven fabrics, chloroprene rubber (CR) or acrylonitrile butadiene rubber (NBR), and the surface of the soundproof layer is processed by a chemical crosslinking and foaming process or a high-pressure foaming process including an embossing and intaglio technique.

* * * * *